US012370550B2

(12) United States Patent
Slominski

(10) Patent No.: US 12,370,550 B2
(45) Date of Patent: Jul. 29, 2025

(54) MICROFLUIDIC DEVICES CONTAINING REVERSIBLY PINNED DROPLET SAMPLES AND METHODS

(71) Applicant: Nuclera Ltd, Cambridge (GB)

(72) Inventor: Luke Slominski, Sharon, MA (US)

(73) Assignee: NUCLERA LTD, Cambridge (GB)

( * ) Notice: Subject to any disclaimer, the term of this patent is extended or adjusted under 35 U.S.C. 154(b) by 329 days.

(21) Appl. No.: 18/083,143

(22) Filed: Dec. 16, 2022

(65) Prior Publication Data

US 2023/0118235 A1 Apr. 20, 2023

Related U.S. Application Data

(63) Continuation of application No. 16/884,274, filed on May 27, 2020, now Pat. No. 11,554,375.

(60) Provisional application No. 62/858,474, filed on Jun. 7, 2019.

(51) Int. Cl.
*B01L 3/00* (2006.01)

(52) U.S. Cl.
CPC ... *B01L 3/502792* (2013.01); *B01L 3/502746* (2013.01); *B01L 2200/10* (2013.01); *B01L 2300/165* (2013.01); *B01L 2400/0427* (2013.01)

(58) Field of Classification Search
CPC ......... B01L 3/502746; B01L 3/502792; B01L 2200/10; B01L 2300/0645; B01L 2300/165; B01L 2400/0427
See application file for complete search history.

(56) References Cited

U.S. PATENT DOCUMENTS

| | | | | |
|---|---|---|---|---|
| 7,767,069 | B2 | 8/2010 | Lee et al. | |
| 8,858,772 | B2 * | 10/2014 | Crane | G02B 26/005 204/600 |
| 8,940,147 | B1 | 1/2015 | Bartsch et al. | |
| 9,248,450 | B2 | 2/2016 | Bauer | |
| 2010/0044216 | A1 | 2/2010 | Lee et al. | |
| 2011/0180571 | A1 | 7/2011 | Srinivasan et al. | |
| 2014/0141409 | A1 | 5/2014 | Foley et al. | |
| 2016/0199832 | A1 * | 7/2016 | Jamshidi | B01F 33/3021 204/600 |
| 2020/0298238 | A1 * | 9/2020 | Kim | B01L 3/502792 |

(Continued)

OTHER PUBLICATIONS

European Office Action for Application No. 20818761.7, dated May 17, 2023, 9 pages.

(Continued)

*Primary Examiner* — Patrick Orme
(74) *Attorney, Agent, or Firm* — McCarter & English, LLP

(57) ABSTRACT

A microfluidic device comprising: (a) a plate comprising a substrate, a plurality of electrodes, and a first layer of hydrophobic material applied over the plurality of electrodes; (b) a processing unit operably programmed to perform a method of pinning an aqueous droplet within the microfluidic device; and (c) a controller operably connected to a power source, the processing unit, and the plurality of electrodes. The method of pinning an aqueous droplet comprises: applying an electric field of a first polarity to an aqueous droplet located on the surface of the layer of hydrophobic material and having a first contact angle, to cause the droplet to maintain a second contact angle in the absence of the electric field, wherein the aqueous droplet contains a surfactant and the second contact angle is less than the first contact angle.

16 Claims, 9 Drawing Sheets

(56) References Cited

U.S. PATENT DOCUMENTS

| | | | |
|---|---|---|---|
| 2020/0347840 | A1 | 11/2020 | Paolini, Jr. et al. |
| 2020/0384472 | A1 | 12/2020 | Slominski |

OTHER PUBLICATIONS

Arango et al., Electrogates for stop-and-go control of liquid flow in microfluidics. Appl Phys Lett. 2018;112:153701.
Chen et al., Study of cyanoethyl pullulan as insulator for electrowetting. Sens Actuators B Chem. 2014;199:183-9.
Choi et al., Digital microfluidics. Annu Rev Anal Chem (Palo Alto Calif). 2012;5:413-40.
Li et al., Frequency Dependence of Low-Voltage Electrowetting Investigated by Impedance Spectroscopy. Langmuir. Nov. 14, 2017;33(45):13139-47.
Merriam-Webster.com, During. Retrieved online at: https:www.merriam-webster.com/dictionary/during. 1 page, Jan. 26, 2022.
Sigma-Aldrich, Tween 20 Product Information. Aug. 2005. 2 pages. Retrieved online at: https://www.sigmaaldrich.com/content/ dam/sigma-aldrich/docs/Sigma/Product_Information_Sheet/1/p5927pis.pdf.
Vafaei et al., Liquid-gas surface tension voltage dependence during electrowetting on dielectric testing of water and 5-90 nm gold nanofluids. J Colloid Interface Sci. Mar. 15, 2017;490:797-801.
Wehking et al., Droplet actuation in an electrified microfluidic network. Lab Chip. Feb. 7, 2015;15(3):793-801.
International Preliminary Report on Patentability for Application No. PCT/US2020/034673, dated Dec. 7, 2021, 5 pages.
International Search Report and Written Opinion for Application No. PCT/US2020/034673, dated Sep. 16, 2020, 7 pages.

* cited by examiner time = t1 time = t2 time = t3 time = t4 time = t5 time = t6 time = t7 time = t8 time = t9 time = t1 time = t2 time = t3 time = t1 time = t2 time = t3

MICROFLUIDIC DEVICES CONTAINING REVERSIBLY PINNED DROPLET SAMPLES AND METHODS

REFERENCE TO RELATED APPLICATIONS

This application is a continuation of U.S. patent application Ser. No. 16/884,274, filed May 27, 2020, which claims priority to U.S. Provisional Application No. 62/858,474 filed Jun. 7, 2019, each of which is incorporated by reference herein in its entirety.

BACKGROUND

Digital microfluidic devices use independent electrodes to move droplets in a confined environment, thereby providing a "lab-on-a-chip." Digital microfluidic devices are alternatively referred to as electrowetting on dielectric, or "EWoD," to further differentiate the method from competing microfluidic systems that rely on electrophoretic flow and/or micropumps. A 2012 review of the electrowetting technology was provided by Wheeler in "Digital Microfluidics," *Annu. Rev. Anal. Chem.* 2012, 5:413-40, which is incorporated herein by reference in its entirety. The technique allows sample preparation, assays, and synthetic chemistry to be performed with tiny quantities of both samples and reagents. In recent years, controlled droplet manipulation in microfluidic cells using electrowetting has become commercially-viable; and there are now products available from large life science companies, such as Oxford Nanopore.

Most of the literature reports on EWoD involve so-called "passive matrix" devices (a.k.a. "segmented" devices), whereby ten to twenty electrodes are directly driven with a controller. While segmented devices are easy to fabricate, the number of electrodes is limited by space and driving constraints. Accordingly, it is not possible to perform massive parallel assays, reactions, etc. in passive matrix devices. In comparison, "active matrix" devices (a.k.a. active matrix EWoD, a.k.a. AM-EWoD) devices can have many thousands, hundreds of thousands or even millions of addressable electrodes. The electrodes are typically switched by thin-film transistors (TFTs) and droplet motion is programmable so that AM-EWoD arrays can be used as general purpose devices that allow great freedom for controlling multiple droplets and executing simultaneous analytical processes.

The fundamental operation of an EWoD device is illustrated in the sectional image of FIG. 8. The EWoD 200 includes a cell filled with an oil 202 and at least one aqueous droplet 204. In a basic configuration, as shown in FIG. 8, a plurality of propulsion electrodes 205 are disposed on one substrate and an singular top electrode 206 is disposed on the opposing surface. The cell additionally includes hydrophobic coatings 207 on the surfaces contacting the oil layer, as well as a dielectric layer 208 between the propulsion electrodes 205 and the hydrophobic coating 207. (The upper substrate may also include a dielectric layer, but it is not shown in FIG. 8). The hydrophobic layer prevents the droplet from wetting the surface. When no voltage differential is applied between adjacent electrodes, the droplet will maintain a spheroidal shape to minimize contact with the hydrophobic surfaces (oil and hydrophobic layer). Because the droplets do not wet the surface, they are less likely to contaminate the surface or interact with other droplets except when that behavior is desired. When a voltage differential is applied between adjacent electrodes, the voltage on one electrode attracts opposite charges in the droplet at the dielectric-to-droplet interface, and the droplet moves toward this electrode.

As illustrated in FIG. 8, EWoD devices typically comprise two parallel substrates; however, some EWoD devices may include a single bottom substrate comprising the array of propulsion electrodes that are coated with the layer of hydrophobic material. Typically, when the voltage is turned off in either dual substrate or single substrate EWoD devices, the sample droplets drift from their location on the array of propulsion electrodes. The force causing the drift may be gravity, flow, or other small forces. A current solution to maintaining the droplets in place is by applying a continuous low voltage holding force to hold the droplet in a desired location during operation. Using a continuous low addressing voltage requires constant actuation and will be dependent on the dielectric used. The use of constant actuation, however, may be disadvantageous because over time the constant voltage may degrade the EWoD device or the biological sample present in the droplet. It is also energy inefficient to constantly apply voltage to a droplet when an operation is not being performed on the sample. Thus, there is a need for an improved EWoD device capable of temporarily pinning a droplet in a desired location on the array that does not require a constant application of voltage.

SUMMARY OF INVENTION

In one aspect, there is provided a microfluidic device comprising: (a) a plate comprising a substrate, a plurality of electrodes, and a first layer of hydrophobic material applied over the plurality of electrodes; (b) a processing unit operably programmed to perform a method of pinning an aqueous droplet within the microfluidic device; and (c) a controller operably connected to a power source, the processing unit, and the plurality of electrodes. The method of pinning an aqueous droplet comprises: applying an electric field of a first polarity to an aqueous droplet located on the surface of the layer of hydrophobic material and having a first contact angle, to cause the droplet to maintain a second contact angle in the absence of the electric field, wherein the aqueous droplet contains a surfactant and the second contact angle is less than the first contact angle.

In another aspect, there is provided a microfluidic device comprising: (a) a top plate comprising: a top substrate, a first layer of hydrophobic material applied to a surface of the top substrate, and a top continuous conductor between the first layer of hydrophobic material and the top substrate; (b) a bottom plate comprising a bottom substrate, a plurality of electrodes and a second layer of hydrophobic material applied over the plurality of electrodes; (c) a processing unit operably programmed to perform a method of pinning an aqueous droplet within the microfluidic device; and (d) a controller operably connected to a power source, the processing unit, and the plurality of electrodes. The method of pinning an aqueous droplet comprises: applying an electric field of a first polarity to an aqueous droplet located in a gap between the first and second layers of hydrophobic material, the aqueous droplet having a maximum diameter, to cause the maximum diameter to increase and maintain the increased maximum diameter in the absence of the electric field, wherein the aqueous droplet contains a surfactant.

In yet another aspect, a method of pinning an aqueous droplet containing a surfactant within a microfluidic device is provided. The microfluidic device may comprise a substrate comprising a plurality of electrodes and a layer of hydrophobic material applied over the plurality of electrodes. The method comprises introducing the aqueous droplet to a surface of the layer of hydrophobic material, the aqueous droplet having a first contact angle and applying an electric field of a first polarity to the aqueous droplet causing the aqueous droplet to maintain a second contact angle in the absence of the electric field, and the second contact angle is less than the first contact angle.

In yet another aspect, another method of pinning an aqueous droplet containing a surfactant within a microfluidic device is provided. The microfluidic device may comprise a top substrate including a first layer of hydrophobic material applied to a surface of the top substrate, a continuous conductor between the first layer of hydrophobic material and the top substrate, a bottom substrate comprising a plurality of electrodes and a second layer of hydrophobic material applied over the plurality of electrodes, and a gap between the first and second layers of hydrophobic material. The method comprises introducing the aqueous droplet into the gap, the aqueous droplet having a maximum diameter and applying an electric field of a first polarity to the aqueous droplet causing the maximum diameter to increase and maintain the increased maximum diameter in the absence of the electric field.

These and other aspects of the present invention will be apparent in view of the following description.

BRIEF DESCRIPTION OF DRAWINGS

The drawing Figures depict one or more implementations in accord with the present concepts, by way of example only, not by way of limitations. The drawings are not to scale. In the figures, like reference numerals refer to the same or similar elements.

DEFINITIONS

Figure 1A:
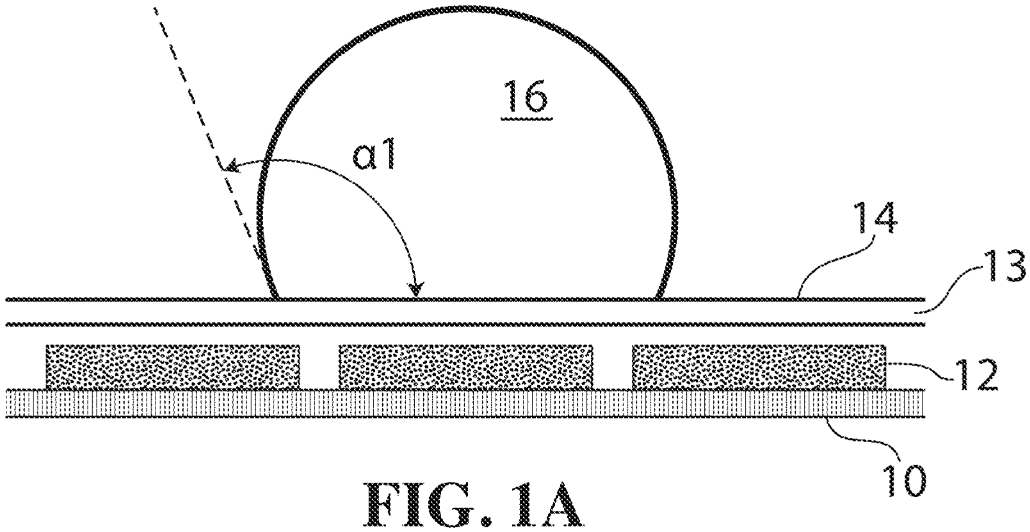
FIG. 1A is a schematic side view of a microfluidic device and sample droplet in an unpinned condition according to a first embodiment of the present invention.

Unless otherwise noted, the following terms have the meanings indicated.

"Actuate" with reference to one or more electrodes means effecting a change in the electrical state of the one or more electrodes which, in the presence of a droplet, results in a manipulation of the droplet.

"Droplet" means a volume of liquid that electrowets a hydrophobic surface and is at least partially bounded by carrier fluid. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include typical polar fluids such as water, as is the case for aqueous or non-aqueous compositions, or may be mixtures or emulsions including aqueous and non-aqueous components. The specific composition of a droplet is of no particular relevance, provided that it electrowets a hydrophobic working surface. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, and/or one more nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes by "synthesizing and stitching together" DNA fragments.

"Droplet operation" means any manipulation of one or more droplets on a microfluidic device. A droplet operation may, for example, include: loading a droplet into the microfluidic device; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

"Maximum diameter," when used in reference to a droplet, is intended to identify the longest straight line segment between two points on the droplet surface.

"Gate driver" is a power amplifier that accepts a low-power input from a controller, for instance a microcontroller integrated circuit (IC), and produces a high-current drive input for the gate of a high-power transistor such as a TFT. "Source driver" is a power amplifier producing a high-current drive input for the source of a high-power transistor. "Top electrode driver" is a power amplifier producing a drive input for a top plane electrode of an EWoD device.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

"Each," when used in reference to a plurality of items, is intended to identify an individual item in the collection but does not necessarily refer to every item in the collection. Exceptions can occur if explicit disclosure or context clearly dictates otherwise.

Reference throughout this specification to "one embodiment," "certain embodiments," "one or more embodiments" or "an embodiment," whether or not including the terms "exemplary" or "non-exclusive" preceding the term "embodiment," means that a particular feature, structure, material, step, or characteristic described in connection with the embodiment is included in at least one embodiment of the present invention. Thus, the appearances of the phrases such as "in one or more embodiments," "in certain embodiments," "in one embodiment" or "in an embodiment" in various places throughout this specification are not necessarily referring to the same embodiment of the present invention. Furthermore, the particular features, structures, materials, steps, or characteristics may be combined in any suitable manner in one or more embodiments.

Within the context of the present application, when a first part of an item is described as been "applied" to or over one or more second parts, the resulting assembly need not necessarily feature the first and second parts in direct physical contact. Rather, and unless specifically or inherently stated in the application, one or more third parts may be physically interposed between the first and second parts. By way of example, when a layer of hydrophobic material is described as applied over a plurality of electrodes, one or more additional layers, for example a dielectric layer, may be interposed between the hydrophobic material and electrodes.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The various embodiments of the present invention provide an EWoD device including either a single plate or dual plates. As depicted herein the "bottom" plate includes a plurality of electrodes to propel various droplets through a microfluidic region. The "top" plate, if present, includes a layer of conductive material, which serves as a common conductor. The use of "top" and "bottom" is merely a convention as the locations of the two plates can be switched, and the devices can be oriented in a variety of ways, for example, the top and bottom plates can be roughly parallel while the overall device is oriented so that the plates are normal to a work surface (as opposed to parallel to the work surface as shown in the figures). The top or the bottom plate may include additional functionality, such as resistive heating and/or temperature sensing. Various materials that may be used to form the top and/or bottom substrate include, but are not limited to, glass and other oxides, semiconductor materials (e.g. silicon), plastics (e.g. acrylics), and combinations thereof.

Microfluidic Devices

Figure 1B:
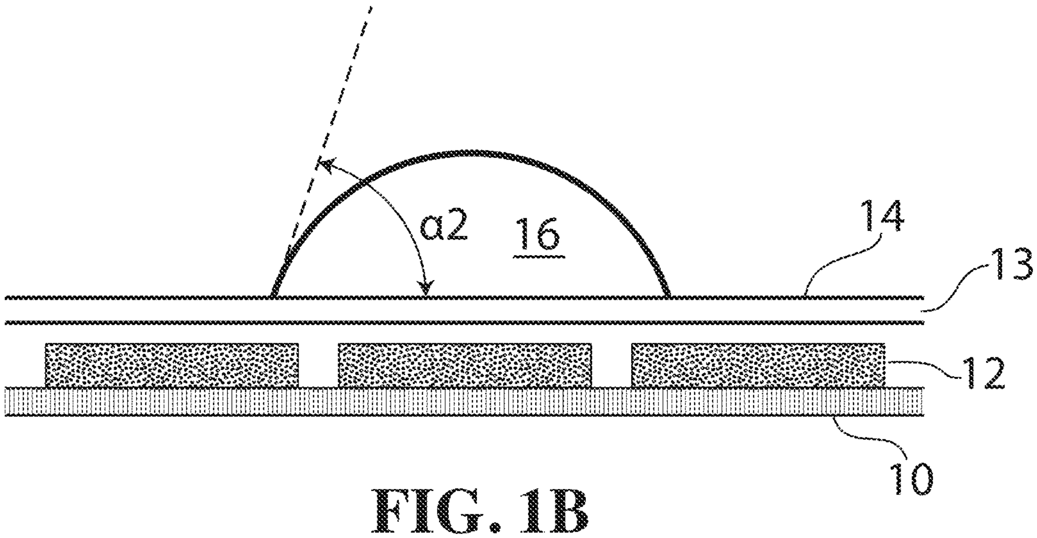
FIG. 1B is a schematic side view of the microfluidic device of FIG. 1A with the sample droplet in a pinned condition.

Referring now to FIGS. 1A and 1B, the bottom plate of a microfluidic device comprises a bottom substrate 10. The bottom substrate 10 has an interior surface to which a plurality of electrodes 12 may be applied. The electrodes may be a passive matrix or an active matrix, such as a TFT array. A layer of dielectric material 13 is coated over the plurality of electrodes, preferably over the entire area of the electrodes, as well as a layer of hydrophobic material 14. The dielectric layer may comprise a layer of approximately 20-40 nm $SiO_2$ over-coated with 200-400 nm plasma-deposited silicon nitride. Alternatively, the dielectric may comprise atomic-layer-deposited $Al_2O_3$ between 2 and 100 nm thick, preferably between 20 and 60 nm thick. The hydrophobic layer can be constructed from materials such as Teflon® AF (Sigma-Aldrich, Milwaukee, WI), Cytop® (AGC Chemicals, Exton, PA) and FlurorPel™ coatings from Cytonix (Beltsville, MD), which can be spin coated over the dielectric layer.

Figure 9:
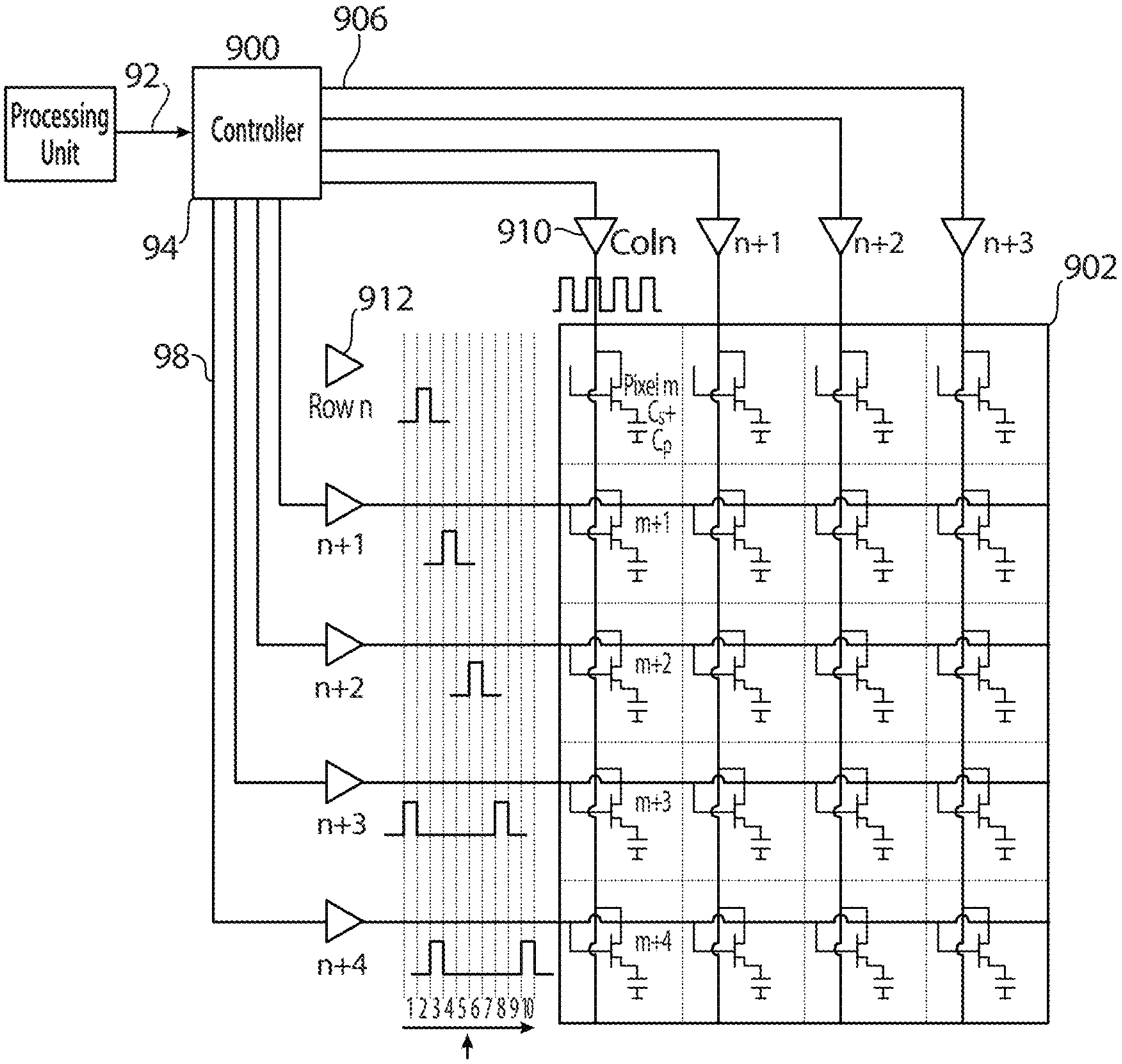
FIG. 9 is a schematic diagram of a TFT architecture for a plurality of propulsion electrodes of an EWoD device.

The electrodes are electrically connected to a power source and controller to generate an electric field with one or more electrodes. FIG. 9 is a diagrammatic view of an exemplary driving system 900 for controlling droplet operation by an AM-EWoD propulsion electrode array 902. The AM-EWoD driving system 900 may be in the form of an integrated circuit adhered to a support plate. The elements of the EWoD device are arranged in the form of a matrix having a plurality of data lines and a plurality of gate lines. Each element of the matrix contains a thin film electrode (TFT) for controlling the electrode potential of a corresponding electrode, and each TFT is connected to one of the gate lines and one of the data lines. The electrode of the element is indicated as a capacitor $C_p$.

The controller shown comprises a microcontroller 904 including control logic and switching logic. It receives input data relating to droplet operations to be performed from the processing unit through the input data lines 92. The microcontroller has an output for each data line of the EWoD matrix, providing a data signal. A data signal line 906 connects each output to a data line of the matrix. The microcontroller also has an output for each gate line of the matrix, providing a gate line selection signal. A gate signal line 908 connects each output to a gate line of the matrix. A data line driver 910 and a gate line driver 912 is arranged in each data and gate signal line, respectively. The figure shows the signals lines only for those data lines and gate lines shown in the figure. The gate line drivers may be integrated in a single integrated circuit. Similarly, the data line drivers may be integrated in a single integrated circuit. The integrated circuit may include the complete gate driver assembly together with the microcontroller.

Instructions which are stored in a computer-readable medium program the processing unit to execute desired droplet operations, including methods for pinning aqueous droplets in the microfluidic device. The processing unit calculates of the polarity, frequency, and amplitude of each of the pulses applied to the electrodes which are to take part in pinning the droplet. Then, the processing unit outputs instructions to the controller through input data line 92, and the controller outputs signals to the drivers of the electrodes. In this manner, voltage pulse sequences of varying polarity may be applied to liquid samples and reagents within the device.

While it is possible to have a single layer for both the dielectric and hydrophobic functions, such layers typically require thick inorganic layers (to prevent pinholes) with resulting low dielectric constants, thereby requiring more than 100V for droplet movement. To achieve low voltage actuation, it is better to have a thin dielectric inorganic layer for high capacitance and to be pinhole free, topped by a thin organic hydrophobic layer. With this combination it is possible to have electrowetting operation with voltages in the range +/−10 to +/−50V, which is in the range that can be supplied by conventional TFT arrays. AC driving is used to reduce degradation of the droplets, dielectrics, and electrodes by various electrochemistries. Operational frequencies for EWoD can be in the range 100 Hz to 1 MHz, but lower frequencies of 1 kHz or lower are preferred for use with TFTs that have limited speed of operation. Examples of various architectures for the electrodes and driving methods are disclosed in U.S. patent application Ser. No. 16/161,548, the entire content of which is incorporated by reference herein.

An aqueous droplet 16 may be located on the surface of the hydrophobic material 14. The aqueous droplet 16 may contain a biological sample, for instance. The inventors have surprisingly found that the incorporation of one or more surfactants in the aqueous droplet 16 in combination with the application of a specific pulse sequence may reversibly reduce the contact angle of the droplet, thereby pinning the droplet to the surface of the hydrophobic layer and making it less susceptible to drift in the absence of an electric field.

Non-Ionic Surfactants

In certain embodiments, at least one of the surfactants is a non-ionic surfactant. Polysorbates are a class of non-ionic surfactants typically derived from PEGylated sorbitan (a derivative of sorbitol) esterified with fatty acids. Example polysorbates include Polysorbate 20 (polyoxyethylene (20) sorbitan monolaurate), Polysorbate 40 (polyoxyethylene (20) sorbitan monopalmitate), Polysorbate 60 (polyoxyethylene (20) sorbitan monostearate) and Polysorbate 80 (polyoxyethylene (20) sorbitan monooleate). The number 20 following the 'polyoxyethylene' part refers to the total number of ethylene oxide, that is, $—(CH_2CH_2O)—$, also known as "EO", groups found in the molecule. The number following the 'polysorbate' part is related to the type of fatty acid associated with the polyoxyethylene sorbitan part of the molecule. Monolaurate is indicated by 20, monopalmitate is indicated by 40, monostearate by 60, and monooleate by 80. Common brand names for polysorbates include Tween®, for example Tween 80® (polyoxyethylene sorbitan monooleate), Tween 60® (polyoxyethylene sorbitan monostearate), Tween 40®, (polyoxyethylene sorbitan monopalmitate), and Tween 20® (polyoxyethylene sorbitan monolaurate).

Other exemplary non-ionic surfactants include alkoxylated, such as ethoxylated and/or propoxylated, alcohols having 8 to 22 carbon atoms, preferably 8 to 18 carbon atoms. The alkoxylated alcohols contain an average of 1 to 20, preferably 1 to 15, particularly preferably 5 to 15 moles alkylene oxide groups, such as EO, per mole alcohol. The alcohol group may be linear or preferably methyl-branched in the 2-position or may comprise linear and methyl branched groups in the mixture, as typically occur in oxoalcohol groups. In one embodiment, the alcohol ethoxylates include linear groups from alcohols of natural origin with 12 to 18 carbon atoms, e.g., from coco-, palm-, tallow- or oleyl alcohol, and an average of 2 to 8 EO or 5 to 15 EO per mole alcohol. Exemplary preferred ethoxylated alcohols include $C_{12-14}$-alcohols with 3 EO or 4 EO, $C_{9-11}$-alcohols with 7 EO, $C_{13-15}$-alcohols with 3 EO, 5 EO, 7 EO or 8 EO, $C_{12-18}$-alcohols with 3 EO, 5 EO or 7 EO and mixtures thereof, as well as mixtures of $C_{12-14}$-alcohols with 3 EO and $C_{12-18}$-alcohols with 5 EO. The cited degrees of ethoxylation constitute statistically average values that can be a whole or a fractional number for a specific product. Preferred alcohol ethoxylates have a narrowed homolog distribution ("narrow range ethoxylates", a.k.a. NRE). In addition to these non-ionic surfactants, fatty alcohols with more than 12 EO can also be used. Examples of these are tallow fatty alcohol with 14 EO, 25 EO, 30 EO or 40 EO units.

In addition, substances commonly known to the person skilled in the art as non-ionic emulsifiers can also be considered as non-ionic surfactants. In this context, the non-ionic surfactants comprise, e.g., a polyol group, a polyether group, a polyamine group or a polyamide group or a combination of the above groups as the hydrophilic group. Such compounds are, for example, addition products of $C_8$-$C_{22}$-alkyl-mono- and -oligo glycosides and their ethoxylated analogs, addition products of 2 to 30 moles ethylene oxide and/or 0 to 10, particularly 0 to 5 moles propylene oxide to fatty alcohols with 8 to 22 carbon atoms, to fatty acids with 12 to 22 carbon atoms, and to alkyl phenols with 8 to 15 carbon atoms in the alkyl group, $C_{12}$-$C_{22}$-fatty acid mono- and diesters of addition products of 1 to 30 moles ethylene oxide on glycerin as well as addition products of 5 to 60 moles ethylene oxide on castor oil and on hydrogenated castor oil.

Weakly foaming non-ionic surfactants that possess alternating ethylene oxide and alkylene oxide units can also be employed. Among these, the surfactants with EO-AO-EO-AO blocks are again preferred, wherein one to ten EO or AO groups respectively are linked together, before a block of the other groups follows. Examples of these are surfactants of the general formula $$R^1-O-(CH_2-CH_2-O)_w-(CH_2-\underset{R^2}{\underset{|}{CH}}-O)_x-(CH_2-CH_2-O)_y-(CH_2-\underset{R^3}{\underset{|}{CH}}-O)_z-H$$

in which $R^1$ stands for a linear or branched, saturated or mono- or polyunsaturated $C_{6-24}$-alkyl or alkenyl group, each group $R^2$ or $R^3$ independently of one another is selected from $-CH_3$, $-CH_2CH_3$, $-CH_2CH_2$, $-CH_3$, $-CH(CH_3)_2$, and the indices w, x, y, z independently of one another stand for whole numbers from 1 to 6. They can be manufactured by known methods from the corresponding alcohols $R^1$—OH and ethylene- or alkylene oxide. The group $R^1$ in the previous formula can vary depending on the origin of the alcohol. When natural sources are used, the group $R^1$ has an even number of carbon atoms and generally is not branched, the linear alcohols of natural origin with 12 to 18 carbon atoms, for example coconut, palm, tallow or oleyl alcohol, being preferred. The alcohols available from synthetic sources are, for example, Guerbet alcohols or mixtures of methyl branched in the 2-position or linear and methyl branched groups, as are typically present in oxo alcohols. Independently of the type of alcohol employed for the manufacture of the non-ionic surfactants comprised in the agents, $R^1$ in the previous formula in certain embodiments stands for an alkyl radical with 6 to 24, preferably 8 to 20, particularly preferably 9 to 15 and particularly 9 to 11 carbon atoms. In addition to propylene oxide, especially butylene oxide can be the alkylene oxide unit that alternates with the ethylene oxide unit in the non-ionic surfactants. However, other alkylene oxides are also suitable, in which $R^2$ or $R^3$ independently of one another are selected from $-CH_2CH_2CH_3$ or $-CH(CH_3)_2$.

In addition, non-ionic block copolymers are considered as non-ionic surfactants, such as, for example, those described in U.S. Pat. No. 6,677,293, incorporated herein by reference in its entirety. Here, for example, they can concern AB-, AA'B-, ABB'-, ABA'- or BAB'-block copolymers, wherein A and A' stand for a hydrophilic block and B and B' for a hydrophobic block. The blocks A and A', independently of one another can be a polyalkylene oxide, particularly a polypropylene oxide or polyethylene oxide, polyvinyl pyridine, polyvinyl alcohol, polymethyl vinyl ether, polyvinyl pyrrolidine or a polysaccharide. The blocks B and B', independently of one another, can be for example an optionally substituted alkyl group that can be obtained for example by polymerizing units selected from the group consisting of 1,3-butadiene, isoprene, all isomers of dimethylbutadiene, 1,3-pentadiene, 2,4-hexadiene, α-methylstyrene, isobutylene, ethylene, propylene or styrene or mixtures thereof. The molecular weights of the blocks A, A', B and B' are preferably, independently of one another, between 500 and 50,000 g/mole. According to the invention, at least one of the blocks A and A' is preferably an alkylene oxide.

In one embodiment, the non-ionic surfactants are addition products of alkylene oxide units, particularly ethylene oxide (EO) and/or propylene oxide (PO) units on alkylphenols, wherein the alkyl group of the alkylphenol contains between 6 and 18 carbon atoms, particularly preferably between 6 and 12 carbon atoms, principally 8, 9 or 10 carbon atoms and wherein preferably between 1 and 18 ethylene oxide (EO) units, particularly preferably between 5 and 15 EO units, principally 8, 9 or 10 EO units are added to the alkylphenol group, wherein the cited values are average values and wherein the alkyl group of the alkylphenol can be linear or methyl branched in the 2-position or can comprise linear and methyl branched groups in the mixture, as are typically present in oxoalcohol groups. Commercially available surfactants of this type can be obtained, for example, under the names Triton X-100 (Dow Chemical Company, Missouri) and Disponil NP9 (Cognis, Germany).

Pinning Process

As illustrated in FIG. 1A, the aqueous droplet 16 containing a surfactant has a first contact angle (α1) with respect to the surface of the hydrophobic layer 14. Upon application of an electric field, preferably a voltage having a negative polarity, the contact angle of the droplet 16 will decrease. When the voltage is no longer applied to the droplet 16, i.e. in the absence of an electric field, the droplet 16 will maintain a second contact angle (α2) that is less than the first contact angle (α1), as illustrated in FIG. 1B. The second contact angle (α2) is small enough, such that droplet 16 is effectively pinned and will resist drifting.

As previously noted, the pinning process is reversible. For example, upon applying another voltage to the pinned aqueous droplet 16 having an opposite polarity to the originally applied voltage, such as a positive polarity, the contact angle will increase. In the absence of an electric field, the droplet 16 will maintain the new contact angle that is greater than the second contact angle (α2), preferably greater than or equal to the first contact angle (α1). As a result, the droplet 16 is no longer pinned and is more easily moved and/or manipulated within the device.

Figure 2A:
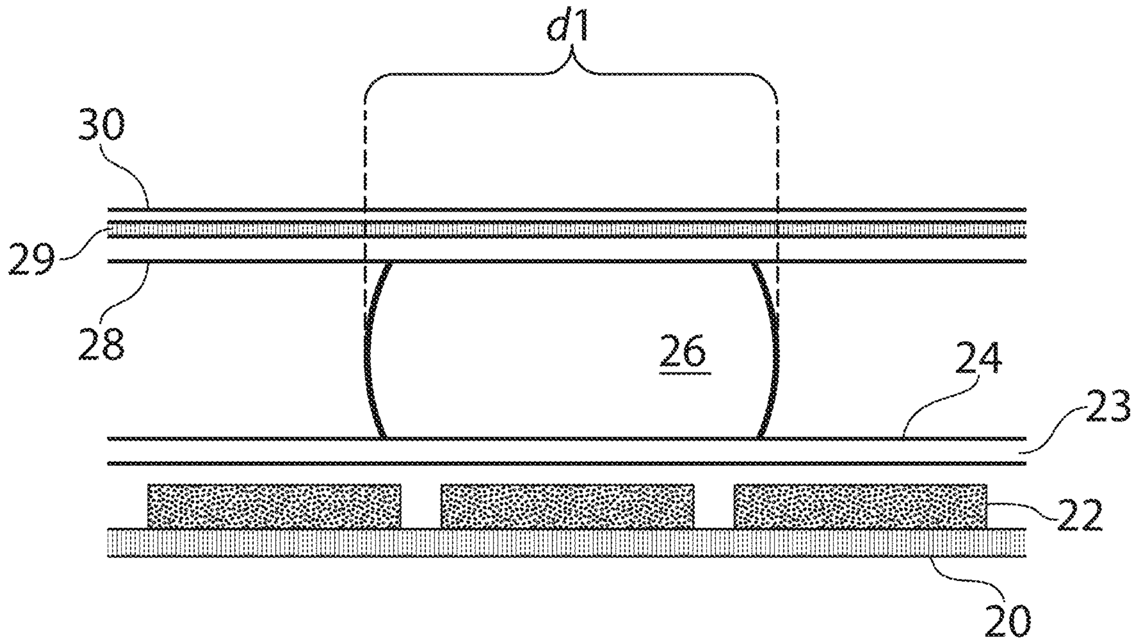
FIG. 2A is a schematic side view of a microfluidic device and sample droplet in an unpinned condition according to a second embodiment of the present invention.
Figure 2B:
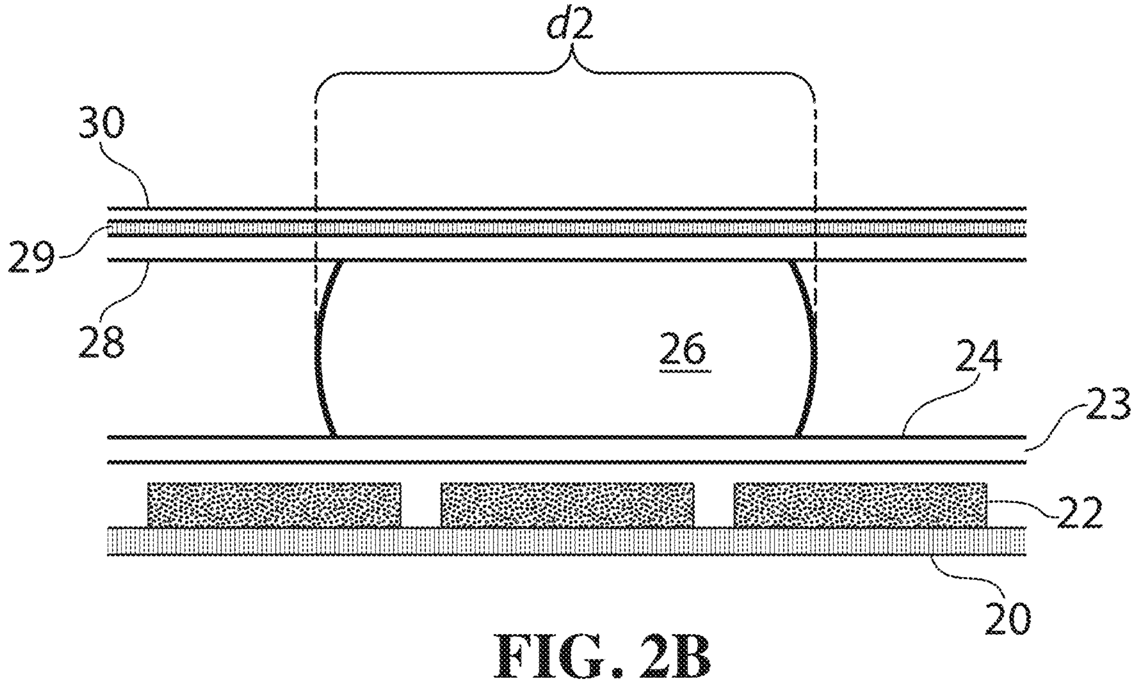
FIG. 2B is a schematic side view of the microfluidic device of FIG. 2A with the sample droplet in a pinned condition.

The process of reversibly pinning an aqueous droplet sample may also be achieved with a dual plate device, such as the device illustrated in FIGS. 2A and 2B. Referring now to FIGS. 2A and 2B, a microfluidic device according to another embodiment of the present invention includes a top plate comprising a top substrate 30 and a bottom plate comprising a bottom substrate 20. The two substrates are generally parallel to each other. The top substrate 30 includes an interior surface to which a continuous layer of conductive material 29 may be applied to most, if not all, of the interior surface. A layer of hydrophobic material 28 may then be applied over the continuous electrode 29. The entire area of the continuous electrode 29 is preferably coated with the layer of hydrophobic material 28. The conductive material of the continuous electrode includes, but is not limited to, metal oxides (e.g. indium tin oxide) and conductive polymers (PEDOT:PSS). The layer of hydrophobic material may be constructed with materials as previously described with respect to the embodiment of FIGS. 1A and 1B.

The bottom substrate 20 of the second embodiment is essentially the same as the first embodiment and includes a plurality of electrodes 22 in the form of a passive matrix or an active matrix. A layer of dielectric material 23 is coated over the plurality of electrodes, preferably over the entire area of the electrodes, as well as a layer of hydrophobic material 24 that may have the same or similar composition as the hydrophobic material layer 28 applied to the top substrate 30. In exemplary embodiments, the gap between the opposing surfaces of hydrophobic material 24, 28 is filled with a gap fluid. A droplet sample 26 propelled within the device should not be miscible in the gap fluid. For example, if the microfluidic device is used to perform operations on aqueous droplet samples, it is preferred that the gap fluid is a hydrophobic fluid, such as silicone oil, dodecane, or other long-chain, non-polar hydrocarbon oils.

The droplet sample 26 comprises a surfactant, such as the surfactants previously described. In FIG. 2A, the droplet 26 is illustrated in an unpinned state and has a first maximum diameter of d1. Upon applying an electric field to the droplet 26, preferably a negative voltage, the maximum diameter of the droplet 26 increases. Removing the applied voltage, i.e. in the absence of an electric field, the droplet 26 maintains a maximum diameter d2 that is greater than the original maximum diameter d1, as illustrated in FIG. 2B. In this state, the droplet 26 is effectively pinned and will resist drifting. Upon applying a voltage having an opposite polarity, such as a positive polarity, the maximum diameter will decrease. On removing the electric field, i.e. in the absence of the electric field, the droplet 26 will maintain the decreased diameter that is less than d2, preferably less than or equal to d1, and revert to an unpinned condition.

Figure 10:
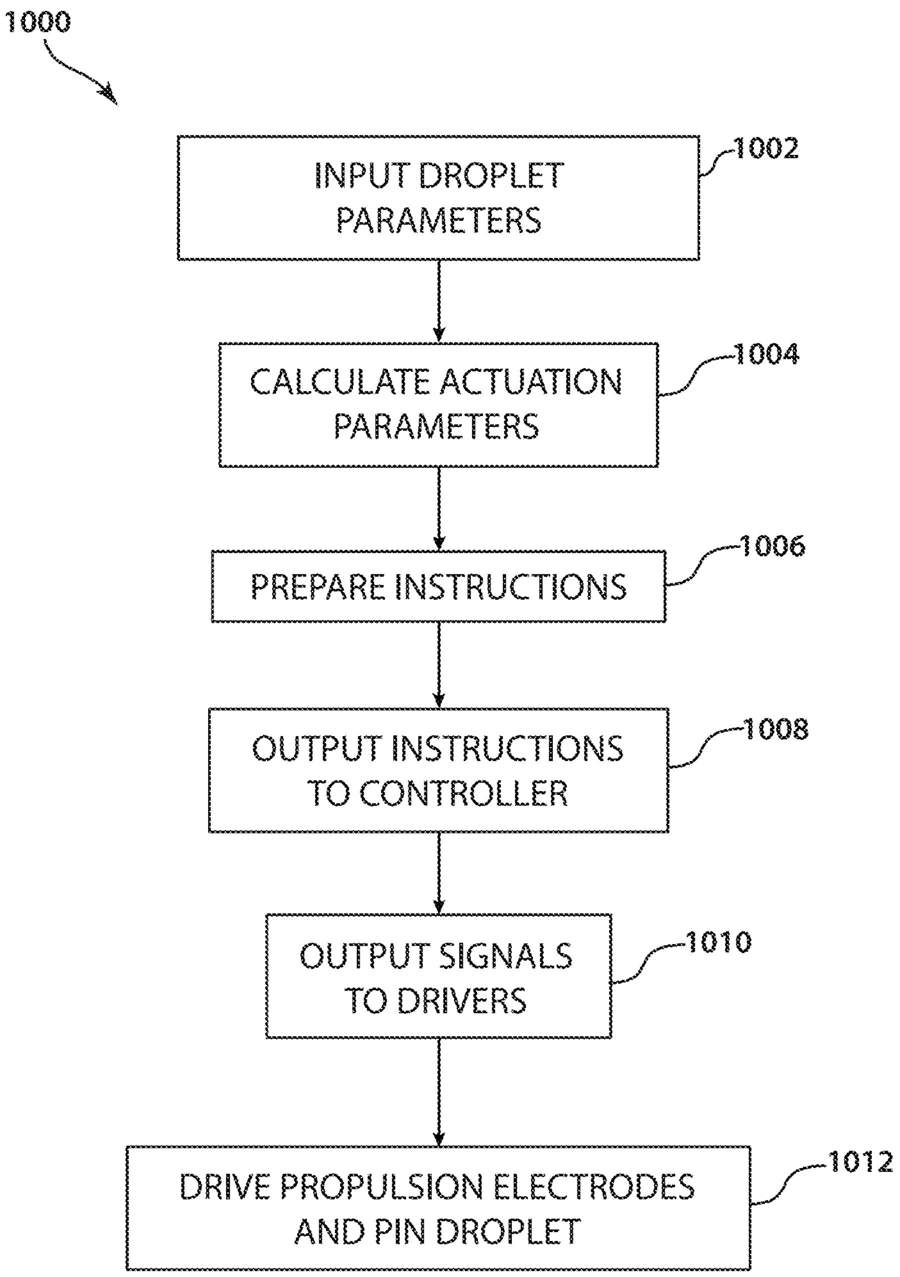
FIG. 10 is a flow chart illustrating an example droplet pinning process according to the present application.

FIG. 10 includes a flow chart illustrative of an example method for pinning a droplet. A number of parameters relating to the droplet is entered in the processing unit of the device (1002). Such parameters usually include its contact angle (or maximum diameter), surfactant content, composition of solvent and solvates, and other variables useful in calculating the actuation parameters (1004), that is, the polarity, frequency, and amplitude of each of the pulses applied to the propulsion electrodes that are to take part in administering the pinning pulse to the droplet. The processing unit then prepare instructions (1006) that are output to the controller (1008). The controller, in turn, signals the drivers of the propulsion electrodes (1010), causing the electrodes to actuate and change the contact angle or maximum diameter until the droplet is pinned (1012).

It may be desired in some applications for the microfluidic device made according to the various embodiments of the present invention to have a light-transmissive top substrate and/or bottom substrate, as well as the layers applied thereto, to perform certain analytical procedures on the droplet samples within the gap of the device. For example, fluorescent markers may be observed by illuminating a droplet through the top substrate with a light source and then using a detector and optionally colored filters to observe the resulting fluorescence through the top substrate. In other embodiments, the light may pass through both the top and bottom substrates to allow absorption measurements in the IR, UV, or visible wavelengths. Alternatively, attenuated (frustrated) total-internal reflection spectroscopy can be used to probe the contents and or location of droplets in the system.

EXAMPLES

The following Examples are now given, though by way of illustration only, to show details of particularly preferred devices and methods according to various embodiments of the present invention.

Example 1

A substrate was prepared by first depositing metal oxide dielectric material onto the substrate follow by a hydrophobic coating of Teflon® AF. A 0.05% wt/wt solution was prepared of Tween 20® in water. A droplet of the solution was pipetted onto the surface of the hydrophobic coating and a voltage was applied through a cat whisker electrode.

Figure 3:
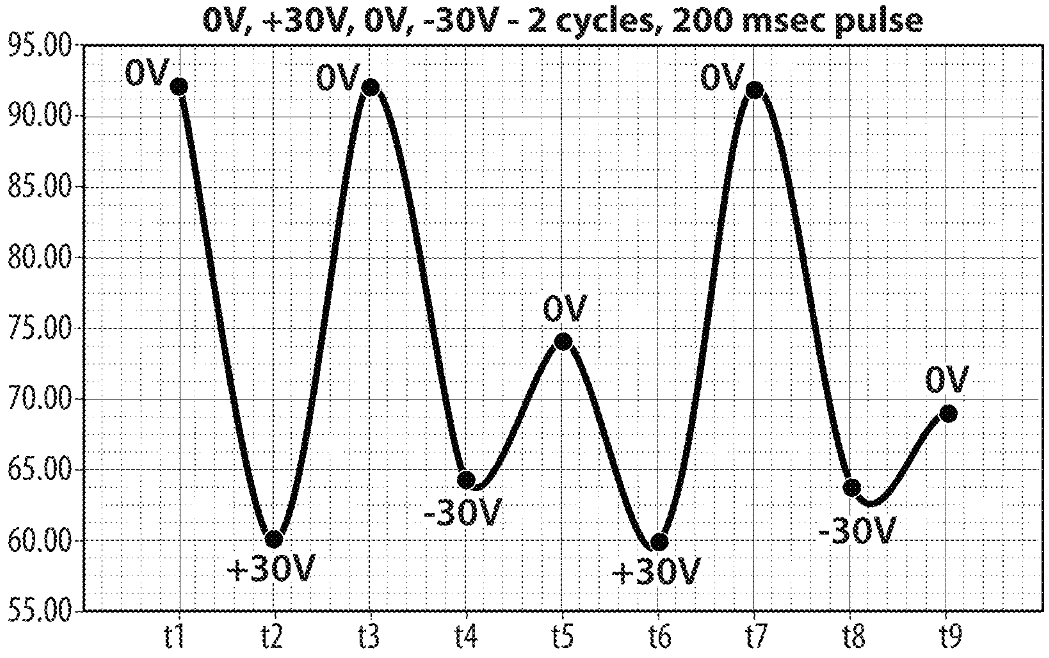
FIG. 3 is a plot of the contact angle of an aqueous droplet sample upon applying a series of voltages according to an embodiment of the present invention.

Five cycles of a sequence of voltages was applied to the droplet. The sequence comprised the following order of voltages: 0V, +30V, 0V, and −30V. The period of each voltage pulse was 200 msec. The contact angle of the droplet was calculated at each voltage pulse. The contact angle results were observed to be essentially the same for each sequence. A plot of the contact angles during the first 2 cycles is provided in FIG. 3. Photographs of the droplet at each voltage during the two cycles are provided in FIGS. 4A to 4I.

Figure 4A:
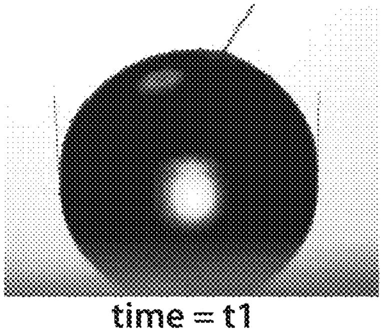
FIGS. 4A to 4I are photographs of the aqueous droplet at various points in time during application of the series of voltages demonstrating the contact angles of FIG. 3.
Figure 4B:
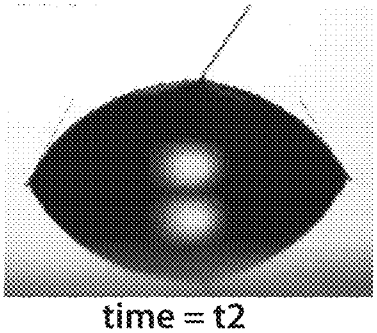
Figure 4C:
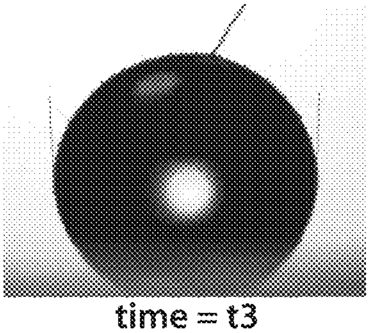
Figure 4D:
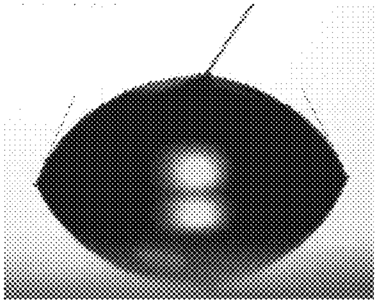
Figure 4E:
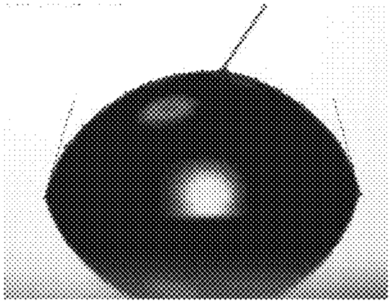
Figure 4F:
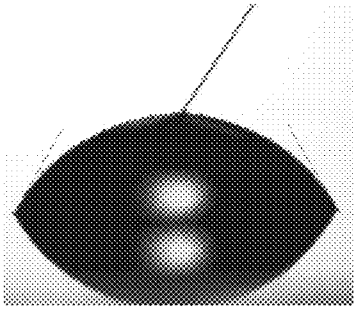
Figure 4G:
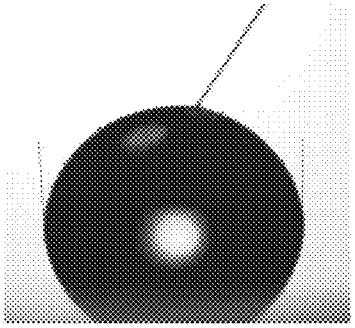
Figure 4H:
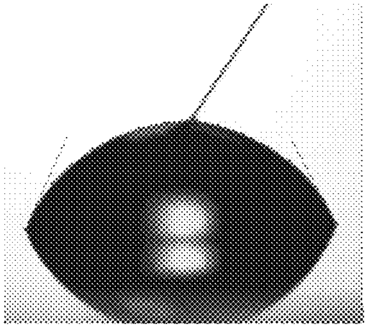
Figure 4I:
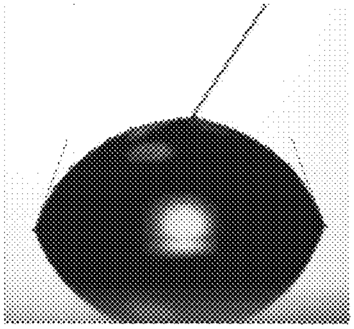

Comparing FIGS. 4A and 4C, it was observed that the initial application of a positive voltage (+30V at time=t2) and subsequently removing the electric field (0V at time=t3) had essentially no effect on the droplet's original contact angle (time=t1). Comparing FIGS. 4C and 4E, after applying a negative voltage (−30V at time=t4) to the droplet, the contact angle maintained by the droplet in the absence of an electric field (0V at time=t5) was less than the contact angle prior to application of the negative voltage (time=t3). Comparing FIGS. 4A and 4G, after applying a positive voltage (+30V at time=t6) to the droplet, the contact angle of the droplet in the absence of an electric field (0V at time=t7) reverted to a value essentially equal to its original contact angle (time=t1) demonstrating a reversible pinning process.

Example 2

Figure 5:
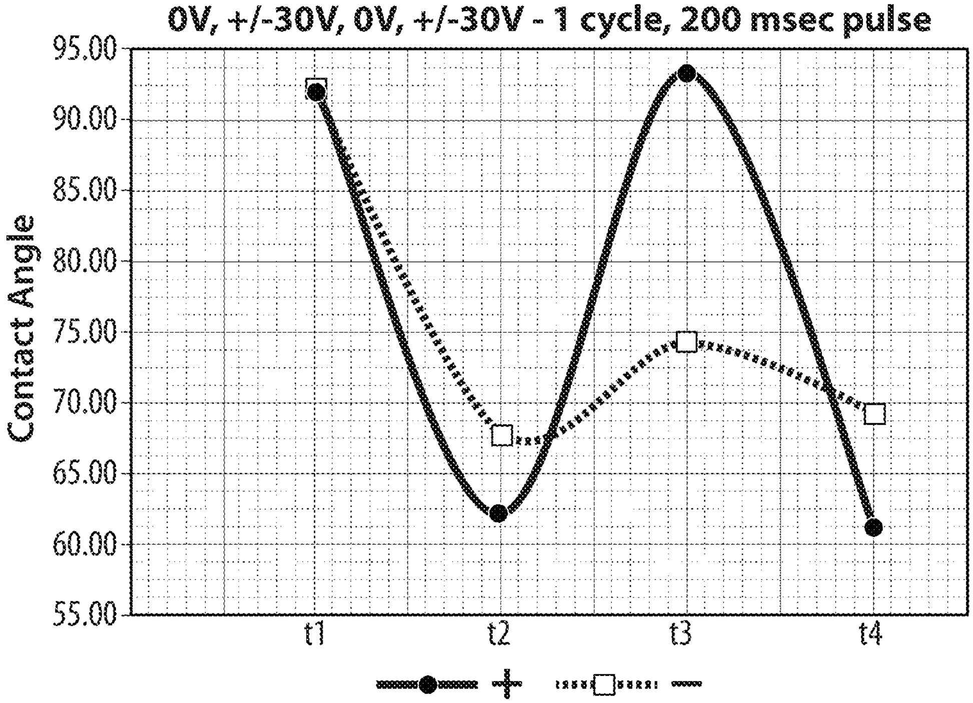
FIG. 5 is plot comparing the contact angle of an aqueous droplet sample upon applying a series of positive or negative voltages.

The surfactant solution and substrate of Example 1 was again tested with two different sequences of voltages. The first sequence comprised the following order of voltages: 0V, +30V, 0V, and +30V. The second sequence comprised the following order of voltages: 0V, −30V, 0V, and −30V. The period of each voltage pulse was 200 msec. The contact angle of the droplet was calculated at each voltage pulse for both sequences. The contact angle results were found to be essentially the same for each sequence. A plot of the contact angles during the first cycle for both sequences is provided in FIG. 5. Photographs of the droplet at each voltage during the cycle of both sequences are provided in FIGS. 6A to 6C and FIGS. 7A to 7C.

Figure 6A:
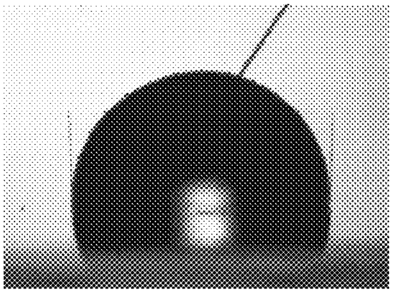
FIGS. 6A to 6C are photographs of the aqueous droplet at various points in time during application of the series of negative voltages demonstrating the contact angles of FIG. 5.
Figure 6B:
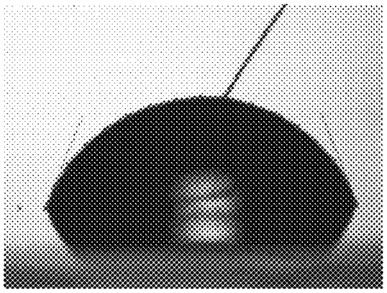
Figure 6C:
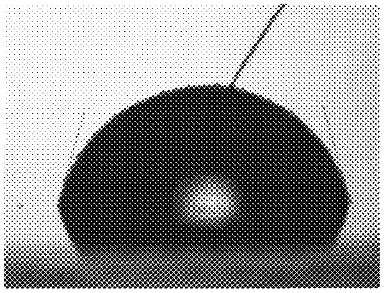
Figure 7A:
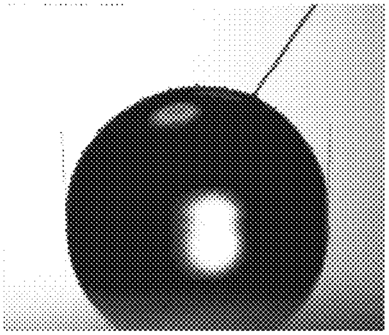
FIGS. 7A to 7C are photographs of the aqueous droplet at various points in time during application of the series of positive voltages demonstrating the contact angles of FIG. 5.
Figure 7B:
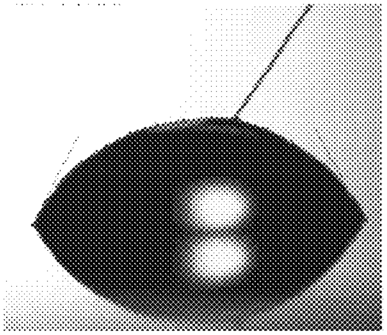
Figure 7C:
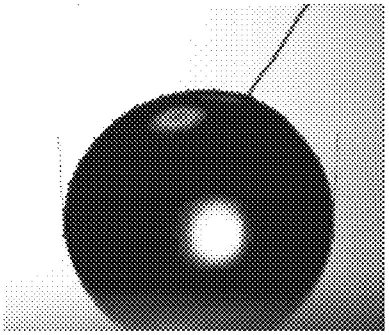
Figure 8:
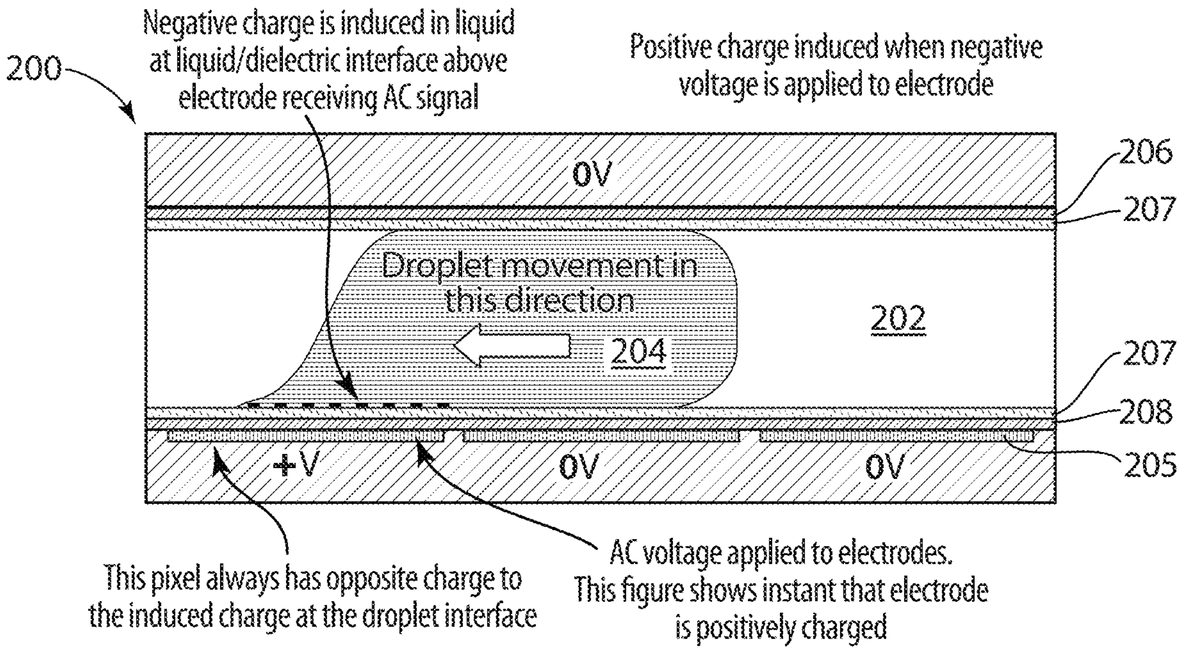
FIG. 8 (Prior Art)
FIG. 8 is a schematic cross-sectional side view of a prior art EWoD device.

Referring to FIGS. 7A to 7C, it was observed that after the application of a positive polarity, the droplet did not demonstrate a reduced contact angle in the absence of an electric field. As shown in FIGS. 6A and 6C, the droplet sample was able to maintain a reduced contact angle in the absence of an electric field after the application of a negative voltage. The reduced contact angle was essentially the same after the application of a series of negative voltage impulses demonstrating that the initial contact angle (time=t1) could not be recovered with a pulse of the same polarity.

From the foregoing, it will be seen that the present invention provides improved devices and methods of reversibly pinning aqueous droplet samples within a microfluidic device. The aqueous droplets resist drift in the absence of an electric field and therefore may provide devices requiring less power for operation, increase the operational lifetime of the devices, and are less likely to adversely affect biological materials within the droplet samples.

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties. In the event of any inconsistency between the content of this application and any of the patents and application incorporated by reference herein, the content of this application shall control to the extent necessary to resolve such inconsistency.

What is claimed is:

1. A microfluidic device comprising:

a first substrate;

a plurality of electrodes;

a first layer of hydrophobic material completely covering the plurality of electrodes;

a plurality of gate line drivers operationally coupled to the plurality of electrodes; and a plurality of data line drivers operationally coupled to the plurality of electrodes, the plurality of data line drivers and the plurality of gate line drivers responsive to one or more signals to apply a first electric field of a first polarity to an aqueous droplet containing a surfactant located at a location on a surface of the first layer of hydrophobic material during a first time and having a first contact angle, and the plurality of data line drivers and the plurality of gate line drivers responsive to one or more signals to halt application of the first electric field to the aqueous droplet containing the surfactant located at the location on the surface of the first layer of hydrophobic material during a second time, the aqueous droplet having a second contact angle and remaining at the location on the surface of the first layer of hydrophobic material in absence of the first electric field, the second contact angle being less than the first contact angle.

2. The microfluidic device of claim 1, wherein the first contact angle is greater than or equal to 90 degrees.

3. The microfluidic device of claim 1, wherein the first contact angle is greater than or equal to 90 degrees and the second contact angle is less than 90 degrees.

4. The microfluidic device of claim 1, wherein the first contact angle is greater than or equal to 90 degrees and the second contact angle is less than 75 degrees.

5. The microfluidic device of claim 1, wherein the first polarity is negative.

6. The microfluidic device of claim 1, wherein the plurality of data line drivers and the plurality of gate line drivers are responsive to one or more signals to apply a second electric field of a second polarity opposite to the first polarity to the aqueous droplet for a third time causing the aqueous droplet to maintain a third contact angle in the absence of the second electric field, the third contact angle being greater than the second contact angle.

7. The microfluidic device of claim 6, wherein the second polarity is positive.

8. The microfluidic device of claim 1, wherein the plurality of data line drivers and the plurality of gate line drivers apply droplet actuation parameters associated with the aqueous droplet.

9. The microfluidic device of claim 8, wherein the droplet actuation parameters account for the surfactant content, or the composition of solvent and solvates.

10. The microfluidic device of claim 8, wherein the droplet actuation parameters include a frequency or amplitude of a pulse applied to the plurality of electrodes to generate the applied electric field.

11. The microfluidic device of claim 1, further comprising a dielectric covering the plurality of electrodes.

12. The microfluidic device of claim 11, wherein the dielectric is adjacent to the first layer of hydrophobic material.

13. The microfluidic device of claim 1, wherein the surfactant is a non-ionic surfactant.

14. The microfluidic device of claim 1, wherein the surfactant comprises polyethylene oxide.

15. The microfluidic device of claim 1, further comprising:

a second substrate;

a continuous conductor, a second layer of hydrophobic material completely covering the continuous conductor, and a gap between the first and second layers of hydrophobic material, wherein the aqueous droplet is introduced into the gap.

16. The microfluidic device of claim 15, wherein the first layer of hydrophobic material on the first substrate and the second layer of hydrophobic material on the second substrate are the same composition.

* * * * *